United States Patent
Kim et al.

(10) Patent No.: US 8,415,038 B2
(45) Date of Patent: Apr. 9, 2013

(54) SECONDARY BATTERY HAVING EXTERNAL TERMINALS

(75) Inventors: Bongyoung Kim, Suwon-si (KR); Kyungwon Seo, Suwon-si (KR); Sangjoo Lee, Suwon-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 361 days.

(21) Appl. No.: 12/789,855

(22) Filed: May 28, 2010

(65) Prior Publication Data

US 2011/0052939 A1    Mar. 3, 2011

(51) Int. Cl.
  *H01M 14/00* (2006.01)
  *H01M 2/02* (2006.01)
  *H01M 2/26* (2006.01)

(52) U.S. Cl.
  USPC .............. 429/7; 429/164; 429/178; 429/185; 429/161

(58) Field of Classification Search ................ 429/7, 61, 429/65, 93, 92, 91, 90, 178, 185, 186, 164, 429/161, 179, 211
  See application file for complete search history.

(56) References Cited

U.S. PATENT DOCUMENTS

| | | |
|---|---|---|
| 2004/0115519 A1 | 6/2004 | Lee |
| 2005/0162131 A1 | 7/2005 | Sennami et al. |
| 2006/0024571 A1 * | 2/2006 | Kim et al. ............. 429/161 |
| 2006/0115725 A1 | 6/2006 | Kim |
| 2008/0254350 A1 | 10/2008 | Moon |

FOREIGN PATENT DOCUMENTS

| | | |
|---|---|---|
| JP | 11-339757 A | 12/1999 |
| JP | 2005-235696 A | 9/2005 |
| KR | 2003-0087981 A | 11/2003 |
| KR | 10-2005-0040737 A | 5/2005 |
| KR | 20-0423760 Y1 | 8/2006 |
| WO | WO 00/79635 A1 | 12/2000 |
| WO | WO 03/096472 A1 | 11/2003 |

OTHER PUBLICATIONS

Korean Notice of Allowance dated Sep. 23, 2011 for Korean Patent Application No. KR 10-2009-0078857 which corresponds to captioned U.S. Appl. No. 12/789,855.
European Search Report dated Nov. 25, 2010 in corresponding European Patent Application No. EP 10 251 230.
Extended European Search Report dated Nov. 25, 2010 for European Patent Application No. EP 10 25 1230.8 which is related to the captioned application.

* cited by examiner

*Primary Examiner* — Raymond Alejandro
(74) *Attorney, Agent, or Firm* — Knobbe Martens Olson & Bear LLP (57) ABSTRACT

A secondary battery is disclosed. The secondary battery includes a cylindrical bare cell having a cylindrical can, and a cap assembly coupled with the cylindrical can. The cap assembly forms a first internal terminal and the cylindrical can forms a second internal terminal. The secondary battery also includes a protective circuit module separated from the cap assembly, connected to the cap assembly by a first connecting tab, and connected to the cylindrical can by a second connecting tab. The secondary battery also includes a first external terminal on a top of the PCM; and a second external terminal electrically connected to the PCM and located on a bottom surface of the cylindrical can.

18 Claims, 7 Drawing Sheets

SECONDARY BATTERY HAVING EXTERNAL TERMINALS

CROSS-REFERENCE TO RELATED APPLICATION

This application claims the benefit of Korean Application No. 10-2009-0078857, filed in the Korean Intellectual Property Office on Aug. 25, 2009, the disclosure of which is incorporated herein by reference.

BACKGROUND OF THE INVENTION

1. Field of the Invention

Aspects of the present invention relate to a secondary battery.

2. Description of the Related Art

Recently, due to rapid development of electronic, communication, and computer industries, portable electronic apparatuses are widespread. Rechargeable secondary batteries are mainly used as the power sources of the portable electronic apparatuses.

Currently, cylinder type secondary batteries are widely used. In the cylinder type secondary battery, a bare cell supplying electric energy is coupled with a protective circuit module (PCM) stably controlling charge and discharge. However, the cylinder type secondary battery may not be used for a general purpose but may be used only for a specific portable electronic apparatus.

SUMMARY OF THE INVENTION

Aspects of the present invention provide a secondary battery that may be used for a general purpose.

According to an aspect of the present invention, a secondary battery is provided. The secondary battery includes: a cylindrical bare cell including a cylindrical can and a cap assembly coupled with the cylindrical can, wherein the cap assembly forms a first electrode and the cylindrical can forms a second electrode; a protective circuit module (PCM) separated from the cap assembly, connected to the cap assembly via a first connecting tab, and connected to the cylindrical can via a second connecting tab; a first external terminal provided on a top of the PCM; and a second external terminal electrically connected to the PCM and provided on a bottom surface of the cylindrical can.

According to another aspect of the present invention, the secondary battery may further include: a top cover covering the PCM and including a first exposing hole exposing the first external terminal; a bottom cover covering the bottom surface of the cylindrical can and including a second exposing hole exposing the second external terminal; and a label covering a side surface of the cylindrical can.

According to another aspect of the present invention, the first external terminal may be exposed to an outside of the top cover through the first exposing hole, and the second external terminal may be plate-shaped.

According to another aspect of the present invention, the secondary battery may further include: a top cover covering the PCM and including a first outermost terminal connected to the first external terminal on an external surface of the top cover; a bottom cover covering the bottom surface of the cylindrical can and including a second outermost terminal connected to the second external terminal on an external surface of the bottom cover; and a label covering a side surface of the cylindrical can.

According to another aspect of the present invention, the first outermost terminal may be connected to the first external terminal through the top cover, and the second outermost terminal may be connected to the second external terminal through the bottom cover.

According to another aspect of the present invention, control elements may be mounted on a bottom surface opposite to the top of the PCM.

According to another aspect of the present invention, the PCM may be electrically connected to a second external terminal by a lead line, the lead line may be provided along the side surface of the cylindrical can, and an insulating layer may be provided between the lead line and the cylindrical can.

According to another aspect of the present invention, the secondary battery may further include: a plurality of cylindrical bare cells serially provided so that the bottom surface of the cylindrical can contacts the cap assembly of one of the plurality of cylindrical bare cells; wherein the PCM includes the first external terminal, which is connected on a cap assembly of a cylindrical bare cell not contacting a bottom surface of another of the plurality of cylindrical bare cells; and a second external terminal provided on a bottom surface of a cylindrical bare cell not contacting a cap assembly of the other cylindrical bare cell among the plurality of cylindrical bare cells.

According to another aspect of the present invention, the secondary battery may include a plurality of cylindrical bare cells; wherein the PCM includes the first external terminal, which is connected to a plurality of first connecting tabs connected to corresponding cap assemblies of each the cylindrical bare cells and to a plurality of second connecting tabs connected to corresponding cylindrical cans of each of the cylindrical bare cells so that the cylindrical bare cells are connected to each other in parallel, and the second external terminal is provided on bottom surfaces of each of the cylindrical cans of the cylindrical bare cells.

According to another aspect of the present invention, the cylindrical bare cell may include: an electrode assembly including a first electrode plate, a second electrode plate, and a separator interposed between the first electrode plate and the second electrode plate to insulate the first electrode plate from the second electrode plate; a cap assembly sealing up the cylindrical can; a bottom insulator provided between the electrode assembly and the bottom surface of the cylindrical can; and a top insulator provided between the electrode assembly and the cap assembly; wherein the cylindrical can accommodates the electrode assembly.

The cylindrical can may include: a cylindrical side surface; wherein the bottom surface of the cylindrical can seals up a bottom of the side surface; and wherein the side surface includes a clipper curved from an upper end of the cylindrical can to an inside of the cylindrical can and a beading unit protruding from the clipper to the inside of the cylindrical can in a position separated by a thickness of the cap assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
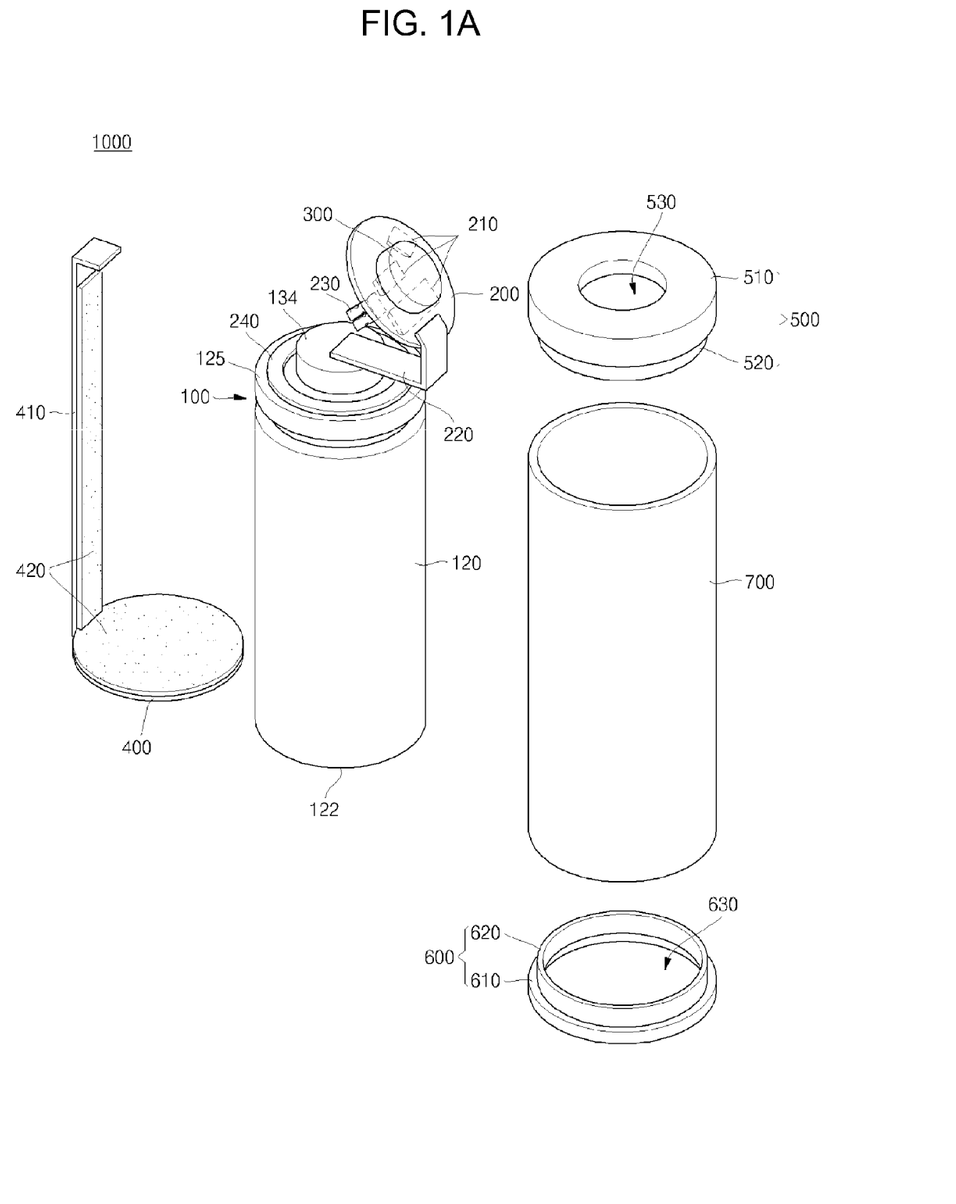
FIGS. 1A and 1B are views illustrating a secondary battery according to an embodiment of the present invention.
Figure 1B:
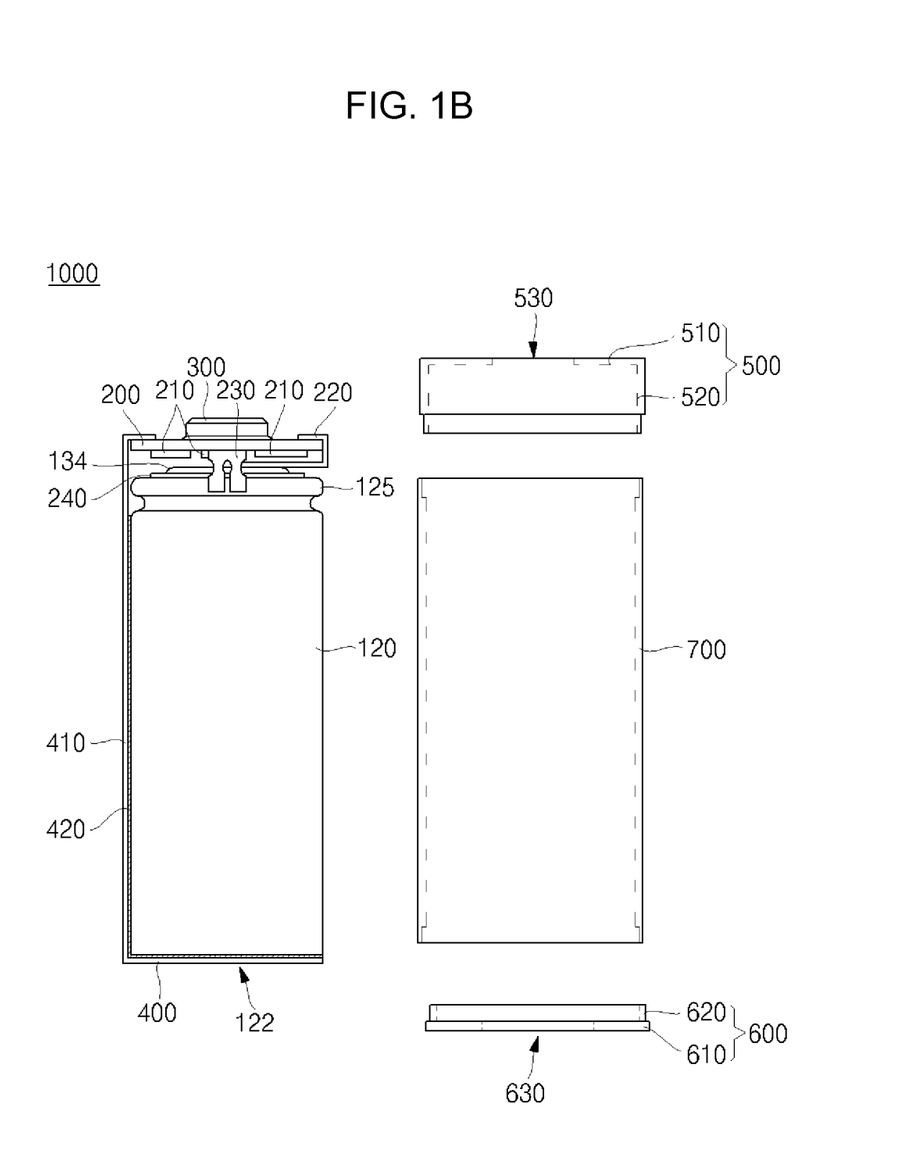
Figure 2:
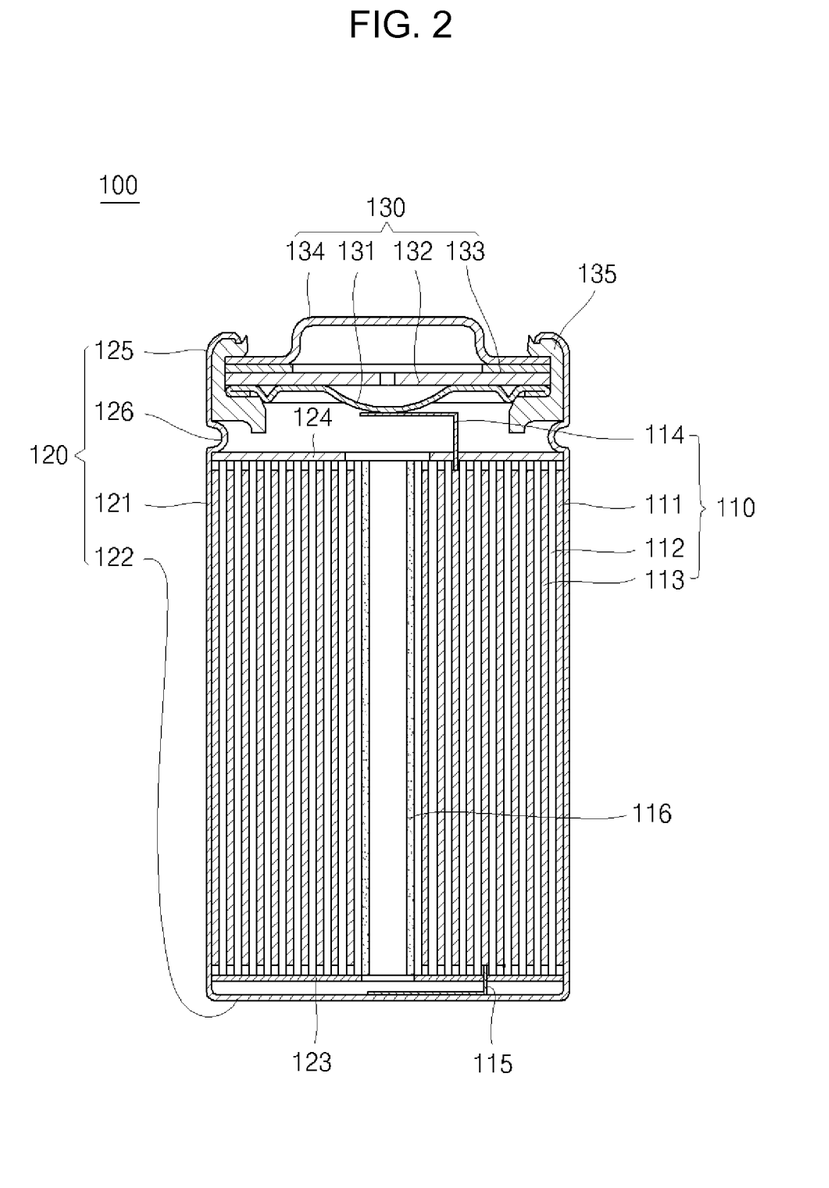
FIG. 2 is a vertical sectional view illustrating a cylindrical bare cell that is a part of the secondary battery according to the embodiment of the present invention.

FIGS. 1A and 1B are views illustrating a secondary battery 1000 according to an embodiment of the present invention. FIG. 1A is an exploded perspective view of the secondary battery 1000, and FIG. 1B is a front view of the secondary battery. FIG. 2 is a vertical sectional view illustrating a cylindrical bare cell that is a part of the secondary battery 1000.

Referring to FIGS. 1A to 2, the secondary battery 1000 includes a cylindrical bare cell 100, a protective circuit module 200, a first external terminal 300, and a second external terminal 400. The secondary battery 1000 may further include a top cover 500, a bottom cover 600, and a label 700.

The cylindrical bare cell 100 includes an electrode assembly 110, a cylindrical can 120, and a cap assembly 130. The electrode assembly 110 includes a first electrode plate 111, a second electrode plate 112, and a separator 113 which insulates the first electrode plate 111 from the second electrode plate 112 when interposed between the first electrode plate 111 and the second electrode plate 112. The first electrode plate 111 operates as a positive electrode and the second electrode plate 112 operates as a negative electrode. Alternatively, the first electrode plate 111 may operate as a negative electrode and the second electrode plate 112 may operate as a positive electrode.

FIG. 2 shows a winding type electrode assembly, in which the first electrode plate 111, the separator 113, and the second electrode plate 112 are wound in a jelly-roll type. However, the electrode assembly employed in the present invention is not limited to the above types; other types of electrode assemblies may also be employed.

The electrode assembly 110 includes a first electrode tab 114 extended from the first electrode plate 111 and a second electrode tab 115 extended from the second electrode plate 112. The first electrode tab 114 extends upward to face the cap assembly 130 to be described later. The second electrode tab 115 extends downward to face the bottom surface 122 of a cylindrical can 120 to be described later. The first electrode tab 114 is electrically connected to the cap assembly 130 and the second electrode tab 115 is electrically connected to the bottom surface 122 of the cylindrical can 120. In the secondary battery 1000, the cap assembly 130 is connected to the first electrode plate 111 to form a first electrode and the cylindrical can 120 is connected to the second electrode plate 112 to form a second electrode. A center pin 116 may be inserted into the center, that is, the wound core of the electrode assembly 110.

The cylindrical can 120 includes a cylindrical side surface 121 and the bottom surface 122 that seals up the bottom of the side surface 121 to provide an accommodating space into which the electrode assembly 110 is accommodated. An opening, into which the electrode assembly 110 is inserted, is formed on the top of the side surface 121. The cylindrical can 120 may further include a bottom insulator 123 disposed between the electrode assembly 110 and the bottom surface 122 to insulate the accommodated electrode assembly 110 from the bottom surface 122. The cylindrical can 120 may further include a top insulator 124 disposed between the electrode assembly 110 and the cap assembly 130 to insulate the accommodated electrode assembly 110 from the cap assembly 130 to be described later.

The cylindrical can 120 includes a clipper 125 inwardly curved from the upper end to press the top of the cap assembly 130 coupled with the opening of the side surface 121. The cylindrical can 120 includes a bead 126 that inwardly protrudes to press the bottom of the cap assembly 130 at the position separated downward from the clipper 125 by the distance corresponding to the thickness of the cap assembly 130. The cylindrical can 120 may be made of a conductive material such as nickel, iron, or an alloy of nickel and iron.

The cap assembly 130 includes a safety vent 131, a current shield 132, a secondary protective element 133, and a cap-up 134. The cap assembly 130 is mounted in the opening of the cylindrical can 120 where the electrode assembly 110 is accommodated, namely, at the upper end of the cylindrical can 120.

The plate shaped safety vent 131 has a center protrusion protruded downward and is positioned under the cap assembly 130. The protrusion of the safety vent 131 is deformed upward by the pressure generated in the secondary battery 1000.

The current shield 132 is mechanically and electrically connected to the safety vent 131 and is formed of a printed circuit board (PCB), on which a pattern is printed. When the safety vent 131 is deformed upward, the pattern is cut off to prevent current from flowing.

The secondary protective element 133 is mechanically and electrically connected to the current shield 132. When the temperature of the secondary battery 1000, in particular, the cylindrical can 120 increases, the resistance of the current shield 132 increases to prevent current from flowing. The cap-up 134 is mechanically and electrically connected to the secondary protective element 133 and is exposed to the outside with an upward-protruded shape.

The cap assembly 130 is integrated by the gasket 135 and is insulated from the cylindrical can 120. The gasket 135 surrounds the outer circumferences of the safety vent 131, the current shield 132, the secondary protective element 133, and the cap-up 134 of the cap assembly 130 to integrate and insulate the cap assembly 130.

The cylindrical bare cell 100 includes the PCM 200 provided on the top surface thereof. The PCM 200 is separated from the cap assembly 130 of the cylindrical bare cell 100. The PCM 200 includes control elements 210 which are mounted on the bottom surface that faces the cap assembly 130. The control elements 210 control the secondary battery 1000. The control elements 210 control the operation of the secondary battery 1000 as well as the charge and discharge of the secondary battery 1000.

The PCM 200 is configured such that the first external terminal 300 and the second external terminal 400 to be described later are formed as the first electrode and the second electrode, respectively. In addition, the PCM 200 may include a circuit so as to perform discharge at a voltage of one of 3.7V, 1.5V, and 1.2V through the first external terminal 300 and the second external terminal 400. Since the top surface of the cylindrical bare cell 100 is substantially circular, the PCM 200 provided on the top surface of the cylindrical bare cell 100 is disk-shaped.

The PCM 200 is electrically connected to the cylindrical bare cell 100 through a first connecting tab 220 and a second connecting tab 230. One end of the first connecting tab 220 is connected to the PCM 200 and the other end of the first connecting tab 220 is connected to the cap assembly 130 of the cylindrical bare cell 100. One end of the first connecting tab 220 is connected to the top surface of the PCM 200 and the other end of the first connecting tab 220 is connected to the cap up 134 of the cap assembly 130. As described above, the cap assembly 130 includes the cap up 134, the secondary protective element 133, the current shielding unit 132, and the safety vent 131 as it goes downward. The safety vent 131 is connected to the first electrode plate 111 of the electrode assembly 110. Accordingly, the first connecting tab 220 connects the cap assembly 130 where the first electrode is formed. Specifically, the first connecting tab 220 connects the cap-up 134 to the PCM 200.

One end of the second connecting tab 230 is connected to the PCM 200 and the other end of the second connecting tab 230 is connected to the cylindrical can 120 of the cylindrical bare cell 100. One end of the second connecting tab 230 is connected to the bottom surface of the PCM 200 and the other end of the second connecting tab 230 is connected to the clipper 125 of the cylindrical can 120.

As described above, the side surface 121 of the cylindrical can 120, which includes the clipper 125, is connected to the bottom surface 122 of the cylindrical can 120, and the bottom surface 122 is connected to the second electrode plate 112 of the electrode assembly 110. Therefore, the second connecting tab 230 connects the cylindrical can 120 where the second electrode is formed. Specifically, the second connecting tab 230 connects the clipper 125 to the PCM 200.

In a method of mounting the PCM 200 above the cap assembly 130 so that the PCM 200 is separated from the cap assembly 130, as illustrated in FIG. 1A, first, one end of the first connecting tab 220 and one end of the second connecting tab 230 are connected to the PCM 200 and the other end of the first connecting tab 220 is welded to the cap-up 134 of the cap assembly 130 by laser welding or resistance welding so as to be fastened to the cap-up 134 of the cap assembly 130.

The center of the first connecting tab 220 is bent so that, while the PCM 200 is separated from the top of the cap assembly 130 by a predetermined distance, the second connecting tab 230 is contacted with the clipper 125 of the cylindrical can 120.

The secondary battery 1000 includes an insulating layer 240 insulating the PCM 200 from the cylindrical can 120 of the cylindrical bare cell 100 on the clipper 125 of the cylindrical can 120, that is, on the surface that faces the PCM 200 in the clipper 125.

The first external terminal 300 is provided on the top surface opposite to the bottom surface, on which the control elements 210 are mounted. The first external terminal 300 may protrude from the top surface of the PCM 200 upward by a predetermined height. The first external terminal 300 connects the secondary battery 1000 to an external apparatus together with the second external terminal 400 to be described later. The first external terminal 300 has a cylindrical shape whose horizontal section is substantially circular. The PCM 200 is configured such that the first external terminal 300 is formed as the first electrode.

The second external terminal 400 is provided on the bottom surface 122 of the cylindrical can 120. The second external terminal 400 has the shape of a plate. For example, the second external terminal 400 may have a shape corresponding to the bottom surface 122 of the cylindrical can 120, namely, the shape of a disk.

The second external terminal 400 is electrically connected to the PCM 200 by a lead line 410 provided along the side surface 121 of the cylindrical can 120. One end of the lead line 410 is connected to the PCM 200, that is, the top surface of the PCM 200, and the other end is connected to the second external terminal 400. An insulating layer 420 is interposed between the lead line 410 and the side surface 121 of the cylindrical can 120 so that a short circuit is not generated between the lead line 410 and the cylindrical can 120.

In FIGS. 1A and 1B, the insulating layer 420 is provided between the lead line 410 and the side surface 121 of the cylindrical can 120 to insulate the lead line 410 from the side surface 121 of the cylindrical can 120. However, if necessary, an insulating layer may be provided on the external surface of the cylindrical can 120 excluding a part of the clipper 125 of the cylindrical can 120 that contacts the second connecting tab 230 can 120 to insulate the lead line 410 from the cylindrical can 120.

The top cover 500 covers the tops of the PCM 200 and the cap assembly 130. The top cover 500 includes a disk-shaped top surface 510 and a side surface 520 extended from the outer circumference of the top surface 510. A first exposing hole 530 exposing the first external terminal 300 is provided in the top surface 510. The first exposing hole 530 has a shape in which the first external terminal 300 may penetrate the first exposing hole 530. The shape may be, for example, a circular hole. In the secondary battery 1000, the first external terminal 300 penetrates the first exposing hole 530 to protrude to the outside of the top cover 500.

The bottom cover 600 covers the bottom surface 122 of the cylindrical can 120. The bottom cover 600 includes a disk-shaped bottom surface 610 and a side surface 620 extended from the outer circumference of the bottom surface 610. A second exposing hole 630 exposing the second external terminal 400 is provided in the bottom surface 610. The second exposing hole 630 may have any shape in which the second external terminal 400 is exposed through the second exposing hole 630. For example, the second exposing hole may be a circular hole that corresponds to the bottom surface 122 of the cylindrical can 100. The label 700 is fastened to the top cover 500 and the bottom cover 600 to fix the top cover 500 and the bottom cover 600 and to cover the side wall 121 of the cylindrical can 120.

Figure 3:
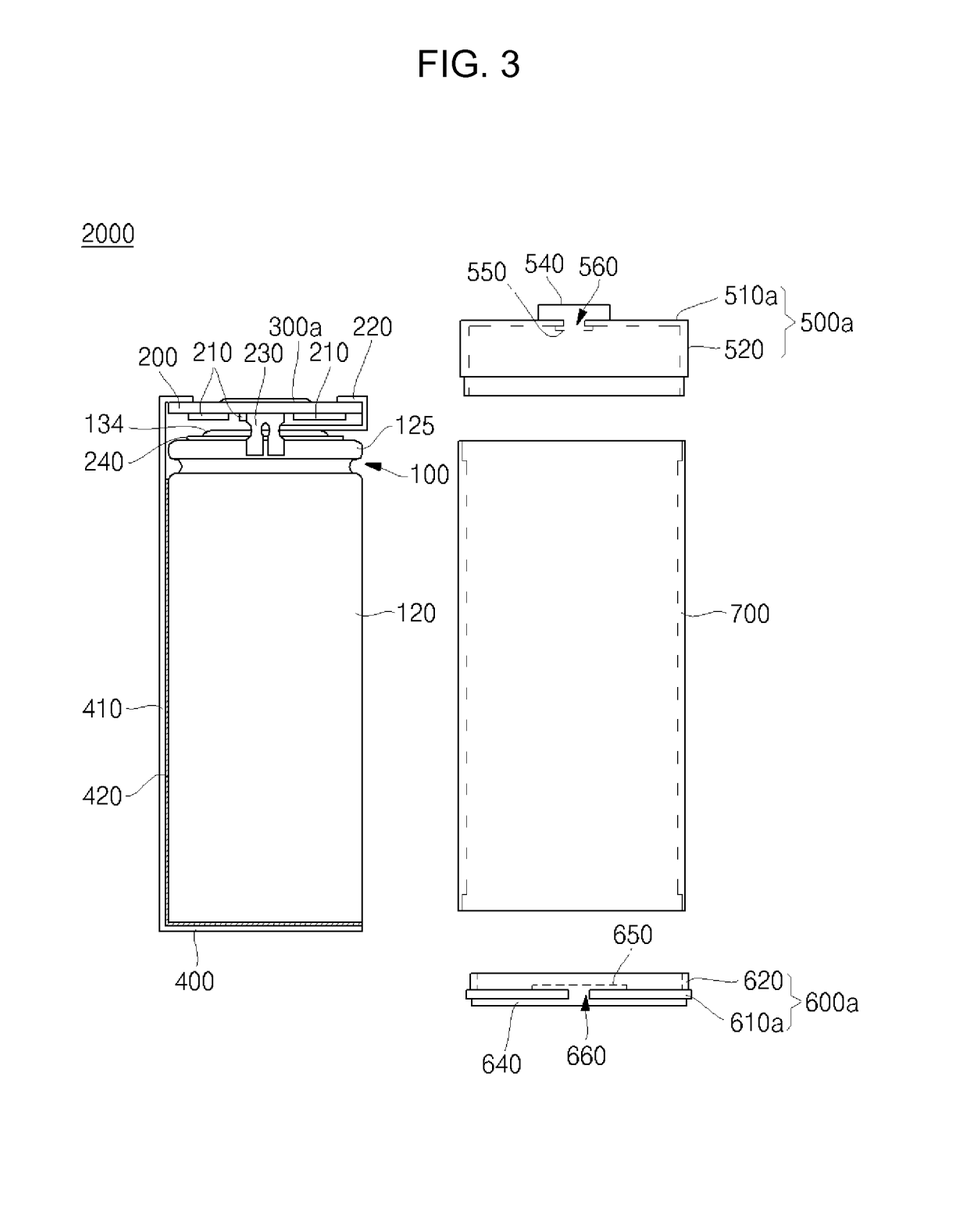
FIG. 3 is a view illustrating a secondary battery according to another embodiment of the present invention.

FIG. 3 is a view illustrating a secondary battery 2000 according to another embodiment of the present invention. Referring to FIG. 3, the secondary battery 2000 differs from the secondary battery 1000 described with reference to FIGS. 1A and 2 with respect to the first external terminal 300, the top cover 500, and the bottom cover 600 of the secondary battery 1000. The other elements of the secondary battery 2000 are similar to the elements of the secondary battery 1000. Accordingly, only the differences between the secondary battery 1000 described with reference to FIGS. 1A to 2 is described and description of similar elements will be omitted.

The secondary battery 2000 includes a pad-shaped first external terminal 300a, a top cover 500a having a first outermost terminal 540, and a bottom cover 600a having a second outermost external terminal 640 corresponding to the first external terminal 300, the top cover 500, and the bottom cover 600 of the secondary battery 1000 described with reference to FIGS. 1A to 2. The first external terminal 300a is in the shape of a pad.

The top cover 500a includes the first outermost terminal 540 on the external surface of the top surface 510a and a first internal pad 550 on the internal surface of the top surface 510*a* and a through-hole 560 penetrating the top surface 510*a* in order to connect the first outermost terminal 540 and the first internal pad 550 to each other.

The first internal pad 550 is contacted with the first external terminal 300*a* to be electrically connected to the first external terminal 300*a*. Since the first internal pad 550 is electrically connected to the first outermost terminal 540, the first outermost terminal 540 performs the same function as the first external terminal 300 of the secondary battery 1000 described with reference to FIGS. 1A to 2.

The bottom cover 600*a* includes a second outermost terminal 640 on the external surface of the bottom surface 610*a* and a second internal pad 650 on the internal surface of the bottom surface 610*a*, and includes a through-hole 660 penetrating the bottom surface 610*a* in order to connect the second outermost terminal 640 and the second internal pad 650 to each other.

The second internal pad 650 is contacted with the second external terminal 400 to be electrically connected to the second external terminal 400. Since the second internal pad 650 is electrically connected to the second outermost terminal 640, the second outermost terminal 640 performs the same function as the second external terminal 400 of the secondary battery 1000 described with reference to FIGS. 1A to 2. The first outermost terminal 540 and the second outermost terminal 640 connect the secondary battery 2000 to an external apparatus.

The secondary battery 2000 includes the first outermost terminal 540 and the second outermost terminal 640 connected to the external apparatus on the top cover 500*a* and the bottom cover 600*a*. Accordingly, the force by which the first outermost terminal 540 and the second outermost terminal 640 are influenced when the secondary battery 2000 is connected to the external apparatus is absorbed by the top cover 500*a*, the bottom cover 600*a*, and the label 700 so that the influence that the PCM 200 has on the internal elements of the secondary battery 2000 may be minimized.

Figure 4:
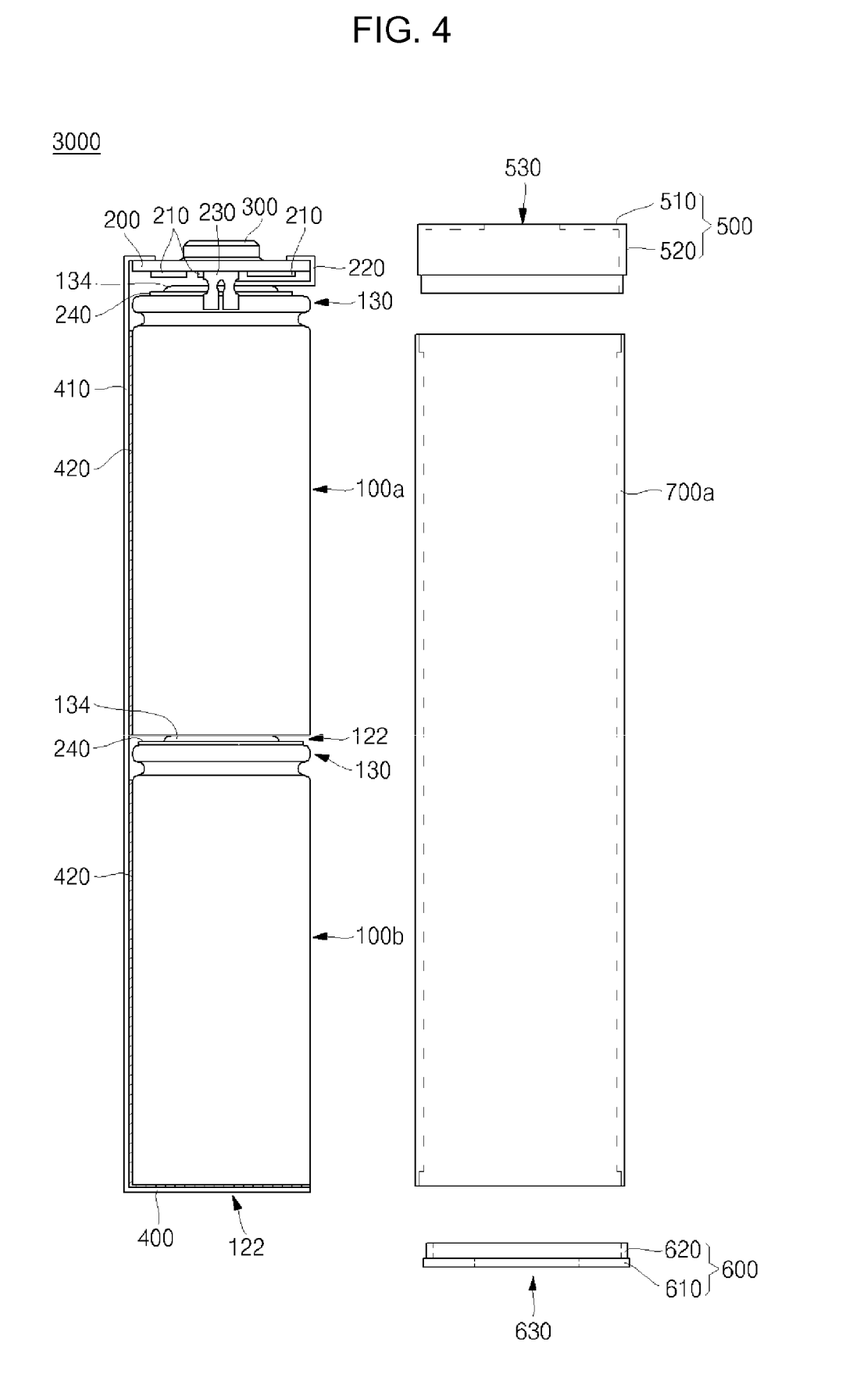
FIG. 4 is a view illustrating a secondary battery according to still another embodiment of the present invention.

FIG. 4 is a view illustrating a secondary battery 3000 according to still another embodiment of the present invention. Referring to FIG. 4, the secondary battery 3000 is different from the secondary battery 1000 described with reference to FIGS. 1A to 2 in that a plurality of cylindrical bare cells are serially connected to each other. As illustrated in FIG. 4, in the secondary battery 3000, the cylindrical bare cells are serially provided such that the bottom surfaces 122 of the cylindrical bare cells are contacted with the cap assemblies 130, specifically, the cap-ups 134 of the cylindrical bare cell that is next in the series.

The PCM 200 including the first external terminal 300 is provided on the cap assembly 130 of the cylindrical bare cell not contacting the bottom surface 122 of the other cylindrical bare cell among the cylindrical bare cells. For example, the PCM 200 may be provided on the topmost cylindrical bare cell, as illustrated in FIG. 4A. The first connecting tab 220 and the second connecting tab 230 are connected to each other.

The second external terminal 400 electrically connected to the PCM 200 through the lead line 410 is provided on the bottom surface 122 of the cylindrical bare cell not contacting the cap assembly 130 of another cylindrical bare cell among the cylindrical bare cells.

When the secondary battery 3000 has the structure as illustrated in FIG. 4, in which two cylindrical bare cells 100*a* and 100*b* are serially connected to each other, the bottom surface 122 of the first cylindrical bare cell 100*a* is contacted with the cap assembly 130, specifically, the cap up 134 of the second cylindrical bare cell 100*b*, such that the first cylindrical bare cell 100*a* and the second cylindrical bare cell 100*b* are serially provided. The PCM 200 is provided on the cap assembly 130 of the first cylindrical bare cell 100*a*, and the second external terminal 400 is provided on the bottom surface 122 of the second cylindrical bare cell 100*b*. The length of a label 700*a* of the secondary battery 3000 is larger than the length of the label 700 of the secondary battery 1000 described with reference to FIGS. 1A to 2.

Figure 5A:
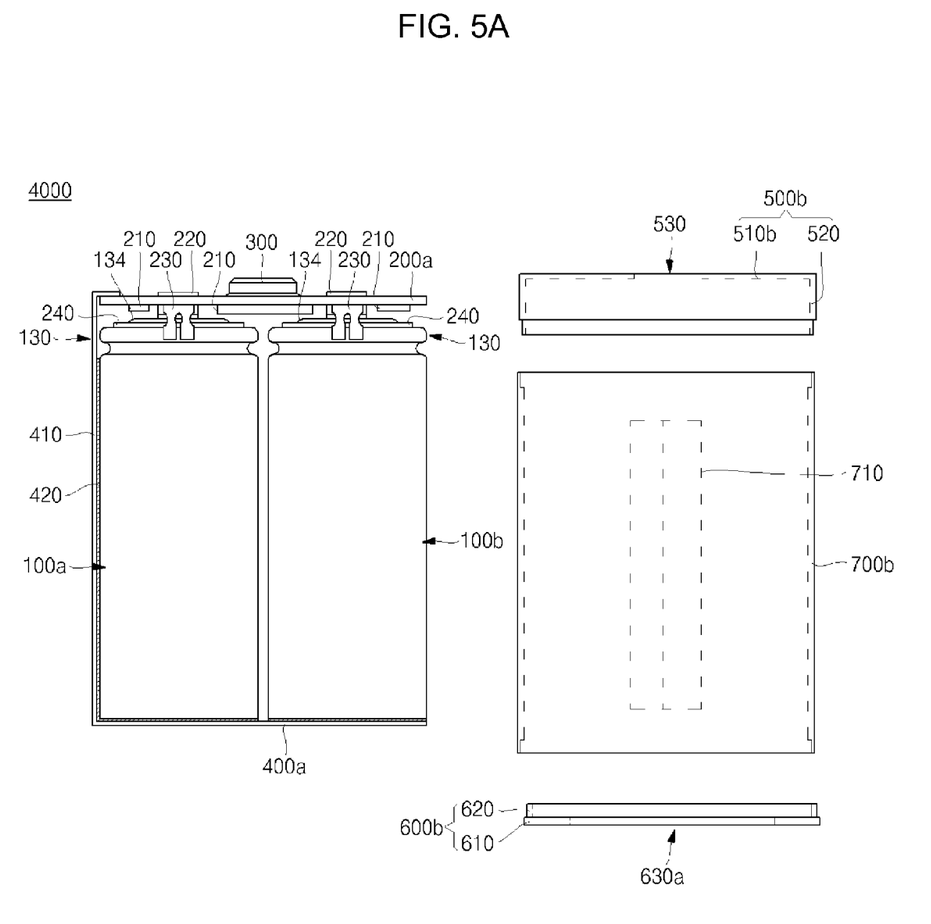
FIGS. 5A and 5B are views illustrating a secondary battery according to yet another embodiment of the present invention.
Figure 5B:
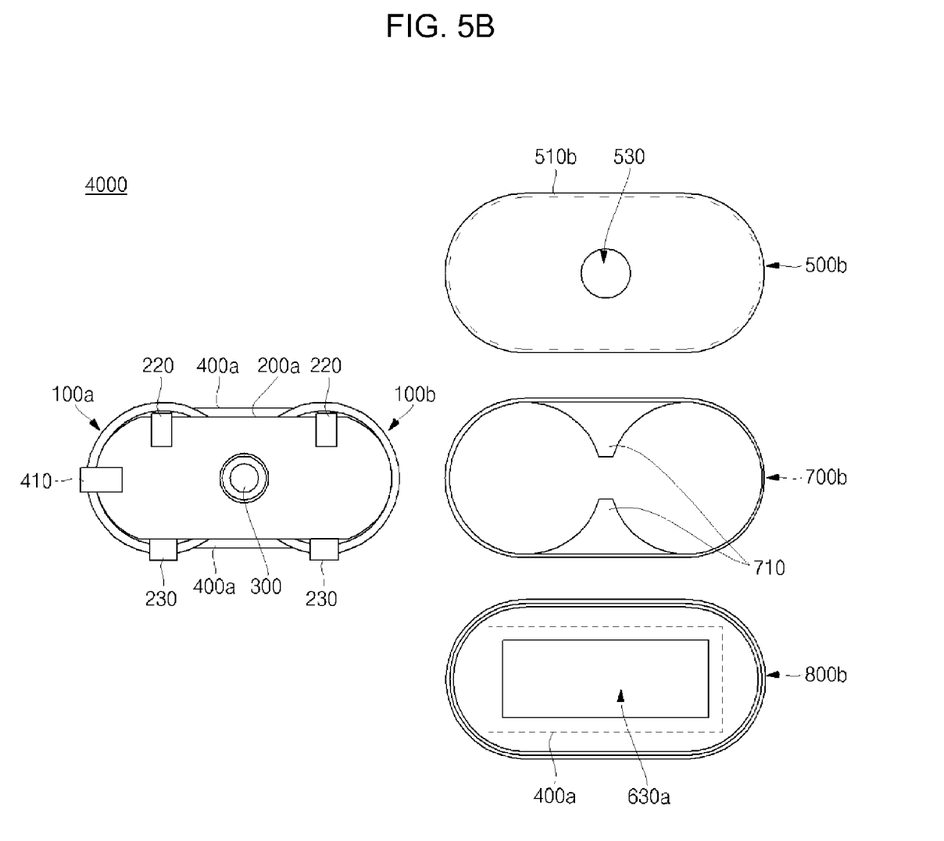

FIGS. 5A and 5B are views illustrating a secondary battery 4000 according to yet another embodiment of the present invention. In FIG. 5B, the elements illustrated in FIG. 5A are illustrated in plane so as to easily understand the structure of the secondary battery 4000. Referring to FIGS. 5A and 5B, the secondary battery 4000 is different from the secondary battery 1000 described with reference to FIGS. 1A to 2 in that a plurality of cylindrical bare cells are connected to each other in parallel. As illustrated in FIGS. 5A and 5B, in the secondary battery 4000, the cap assemblies 130 of the cylindrical bare cells are provided in parallel to face the same direction and a PCM 200*a* including the first external terminal 300 is provided on the cap assemblies 130.

Since the PCM 200*a* is provided on the cap assemblies 130 of the plurality of cylindrical bare cells, as illustrated in FIG. 5B, the shape of the PCM 200*a* is entirely square, and both ends are rounded to correspond to the plane shape of the cylindrical bare cell. Since the PCM 200*a* is connected to the cylindrical bare cells in parallel, the plurality of first connecting tabs 220 connected to the cap assemblies of the cylindrical bare cells are connected to the plurality of second connecting tabs 230 connected to the cylindrical cans of the cylindrical bare cells.

The secondary battery 4000 includes a second external terminal 400*a* over the bottom surfaces of the plurality of cylindrical bare cells provided in parallel. The second external terminal 400*a* may be in the shape of a square plate, in contrast to the disk shape of the second external terminal 400 of the secondary battery 1000.

When the secondary battery 4000 has the structure as illustrated in FIG. 5A, in which the two cylindrical bare cells 100 are serially connected to each other, after the first cylindrical bare cell 100*a* and the second cylindrical bare cell 100*b* are provided in parallel such that the cap assemblies 130 face the same direction, the PCM 200*a* is provided on the cap assemblies 130.

In the PCM 200*a*, the two first connecting tabs 220 contacted with the cap assembly 130, that is, the cap up 134 of the first cylindrical bare cell 100*a* and the cap up 134 of the second cylindrical bare cell 100*b*, respectively, are connected to each other. The two second connecting tabs 230 contacted with the cylindrical can 120 (the clipper 125 of the first cylindrical bare cell 100*a* and the clipper 125 of the second cylindrical bare cell 100*b*, respectively,) are connected to each other.

The PCM 200*a* is electrically connected to the second external terminal 400*a* by the lead line 410. The lead line 410 may be provided in one of the cylindrical bare cells 100*a* and 100*b*.

In the secondary battery 4000, the plurality of cylindrical bare cells are connected to each other in parallel so that the shapes of the top cover 500*b*, the bottom cover 600*b*, and the label 700*b* that surround the outside of the secondary battery 4000 may vary.

As illustrated in FIG. 5B, the plane shapes of the top cover 500*b*, the bottom cover 600*b*, and the label 700*b* are substantially square, and both ends are rounded. The bottom cover 600*b* includes a second exposing hole 630*a* exposing the second external terminal 400*a*. The second exposing hole 630a may be circular like the second exposing hole 630 of the secondary battery 1000 described with reference to FIGS. 1A to 2. Alternatively, the second exposing hole 630a may be a square hole corresponding to the square shape of the second external terminal 400a. The label 700b may include fixing members 710 fixing the cylindrical bare cells 100a and 100b to correct positions on the internal surface thereof.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   a cylindrical cell comprising:
      a cylindrical can, an electrode assembly
      a cap assembly coupled with the cylindrical can, wherein the cap assembly acts as a first terminal and the cylindrical can acts as a second terminal, wherein the electrode assembly comprises:
         a first electrode plate, electrically connected to the cap assembly,
         a second electrode plate, electrically connected to the cylindrical can, and
         a separator interposed between the first electrode plate and the second electrode plate to insulate the first electrode plate from the second electrode plate;
   a protective circuit module separated from the cap assembly, connected to the cap assembly via a first connecting tab, and connected to the cylindrical can via a second connecting tab;
   a first external terminal provided on a top of the protective circuit module; and
   a second external terminal electrically connected to the protective circuit module and provided on a bottom surface of the cylindrical can.

2. The secondary battery of claim 1, further comprising:
   a top cover covering the protective circuit module and including a first exposing hole exposing the first external terminal;
   a bottom cover covering the bottom surface of the cylindrical can and including a second exposing hole exposing the second external terminal; and
   a label covering a side surface of the cylindrical can.

3. The secondary battery of claim 2, wherein:
   the first external terminal is exposed to an outside of the top cover through the first exposing hole; and
   the second external terminal is plate shaped.

4. The secondary battery of claim 1, further comprising:
   a top cover covering the protective circuit module and including a first outermost terminal connected to the first external terminal on an external surface of the top cover;
   a bottom cover covering the bottom surface of the cylindrical can and including a second outermost terminal connected to the second external terminal on an external surface of the bottom cover; and
   a label covering a side surface of the cylindrical can.

5. The secondary battery of claim 4, wherein:
   the first outermost terminal is connected to the first external terminal through the top cover; and
   the second outermost terminal is connected to the second external terminal through the bottom cover.

6. The secondary battery of claim 1, wherein control elements are mounted on a bottom surface of the protective circuit module opposite to the top of the protective circuit module.

7. The secondary battery of claim 1, wherein:
   the protective circuit module is electrically connected to the second external terminal by a lead line;
   the lead line is provided along a side surface of the cylindrical can; and
   an insulating layer is provided between the lead line and the cylindrical can.

8. The secondary battery of claim 1, further comprising:
   a plurality of cylindrical cells serially provided so that the bottom surface of the cylindrical can contacts the cap assembly of one of the plurality of cylindrical cells;
   wherein the protective circuit module includes the first external terminal, which is connected on a cap assembly of a cylindrical cell not contacting a bottom surface of another of the plurality of cylindrical cells; and
   the second external terminal is provided on a bottom surface of a cylindrical cell not contacting a cap assembly of another of the plurality of cylindrical cells.

9. The secondary battery of claim 1, wherein:
   the secondary battery comprises a plurality of cylindrical cells;
   the protective circuit module includes the first external terminal, which is connected to a plurality of first connecting tabs connected to corresponding cap assemblies of each of the cylindrical cells and to a plurality of second connecting tabs connected to cylindrical cans of each of the cylindrical cells so that the cylindrical cells are connected to each other in parallel; and
   the second external terminal is provided on bottom surfaces of each of the cylindrical cans of the cylindrical cells.

10. The secondary battery of claim 1, wherein the cylindrical cell comprises:
    a bottom insulator provided between the electrode assembly and the bottom surface of the cylindrical can; and
    a top insulator provided between the electrode assembly and the cap assembly;
    wherein the cylindrical can accommodates the electrode assembly, and wherein the cap assembly seals the cylindrical can.

11. The secondary battery of claim 10, wherein the cylindrical can comprises:
    a cylindrical side surface;
    wherein the bottom surface seals up a bottom of the cylindrical side surface; and
    wherein the cylindrical side surface comprises a clipper curved from an upper end of the cylindrical can to an inside of the cylindrical can and a beading unit protruding from the clipper to the inside of the cylindrical can in a position separated by a thickness of the cap assembly.

12. The secondary battery of claim 11, wherein the second connecting tab is connected to the clipper.

13. The secondary battery of claim 1, wherein the cap assembly comprises:
    a safety vent positioned underneath the cap assembly;
    a current shield having a printed circuit board printed thereon and connected to the safety vent;
    a secondary protective element connected to the current shield; and
    a cap-up connected to the secondary protective element and exposed to the outside.

14. The secondary battery of claim 13, wherein the safety vent protrudes downward away from the current shield, and experiences an upward force generated by pressure within the secondary battery.

15. The secondary battery of claim 13, wherein the cap-up protrudes upward away from the secondary protective element.

16. The secondary battery of claim 13, wherein the first connecting tab is connected to the cap-up.

17. The secondary battery of claim 4, wherein the first external terminal has a pad shape.

18. The secondary battery of claim 16, wherein:
the plurality of cylindrical cells are arranged in parallel;
the protective circuit module includes the first external terminal, which is connected to a plurality of first connecting tabs and a plurality of second connecting tabs, wherein each of the plurality of first connecting tabs are connected to a corresponding cap assembly of a corresponding cylindrical bare cell and each of the second connecting tabs is connected to a corresponding cylindrical can of a corresponding cylindrical bare cell; and
the second external terminal is connected to the bottom surfaces of each of the plurality of cylindrical bare cells.

* * * * *